United States Patent

Thomas et al.

(10) Patent No.: US 6,302,670 B1
(45) Date of Patent: Oct. 16, 2001

(54) WINDSHIELD REPAIR APPARATUS

(75) Inventors: Jonathan P. Thomas, Maple Lake; Keith A. Beveridge, Edina; Paul S. Petersen, Minnetonka; Jay L. Bickford, Savage, all of MN (US)

(73) Assignee: TCG International Inc., Burnaby (CA)

( * ) Notice: Subject to any disclaimer, the term of this patent is extended or adjusted under 35 U.S.C. 154(b) by 0 days.

(21) Appl. No.: 09/536,675

(22) Filed: Mar. 28, 2000

(51) Int. Cl.$^7$ .............................. B29C 73/02; B32B 77/10
(52) U.S. Cl. ........................... 425/12; 425/13; 264/36.21; 156/94
(58) Field of Search ................... 425/11, 12, 13; 264/36.21; 156/94

(56) References Cited

U.S. PATENT DOCUMENTS

| | | | |
|---|---|---|---|
| D. 398,496 | 9/1998 | Thomas et al. | D8/51 |
| D. 403,563 | 1/1999 | Thomas et al. | D8/51 |
| 3,988,400 | 10/1976 | Luhmann, III | 264/36.21 |
| 3,993,520 | 11/1976 | Werner et al. | 156/94 |
| 4,047,863 | 9/1977 | McCluskey et al. | 425/13 |
| 4,249,869 | 2/1981 | Petersen | 425/13 |
| 4,280,861 | 7/1981 | Schwartz | 156/94 |
| 4,291,866 | 9/1981 | Petersen | 156/94 |
| 4,385,879 | 5/1983 | Wilkinson | 425/12 |
| 4,597,727 | 7/1986 | Birkhauser, III | 425/12 |
| 4,681,520 | 7/1987 | Birkhauser, III | 425/12 |
| 4,744,841 | 5/1988 | Thomas | 156/94 |
| 4,775,305 | 10/1988 | Alexander et al. | 425/12 |
| 4,814,185 | 3/1989 | Jones | 425/12 |
| 4,820,148 | 4/1989 | Anderson | 425/12 |
| 4,919,602 | 4/1990 | Janszen | 425/12 |
| 4,921,411 | 5/1990 | Ottenheimer | 425/12 |
| 4,954,300 | 9/1990 | Dotson | 264/36.21 |
| 4,995,798 | 2/1991 | Ameter | 425/12 |
| 5,104,304 | 4/1992 | Dotson | 425/12 |
| 5,116,441 | 5/1992 | Campfield, Jr. | 156/94 |
| 5,122,042 | 6/1992 | Einiger | 425/12 |
| 5,234,325 | 8/1993 | Hill | 425/12 |
| 5,425,827 | 6/1995 | Campfield | 156/94 |
| 5,429,692 | 7/1995 | Campfield | 156/94 |
| 5,565,217 | 10/1996 | Beckert et al. | 425/12 |
| 5,776,506 | 7/1998 | Thomas et al. | 425/12 |
| 5,952,012 | 9/1999 | Thomas et al. | 425/12 |
| 5,954,901 | 9/1999 | Henderson | 156/94 |
| 6,050,799 | 4/2000 | Galyon | 425/12 |
| B1 5,116,441 | 11/1993 | Campfield, Jr. | 156/94 |

FOREIGN PATENT DOCUMENTS

296671-A1 * 12/1988 (EP).
WO 00/15419 3/2000 (WO).

* cited by examiner

Primary Examiner—Nam Nguyen
Assistant Examiner—Thukhanh T. Nguyen
(74) Attorney, Agent, or Firm—Merchant & Gould P.C.

(57) ABSTRACT

A windshield repair apparatus is provided which includes a bridge having a base member including an injection holder and a pivot support member pivotally connected to the base member. A suction cup is disposed for connection with the pivot support member for mounting the bridge to the windshield. A yoke extends upward from the suction cup to pivotally connect the suction cup to the pivot support member of the bridge. The yoke includes at least two side members which are adapted to receive the pivot support member of the bridge therebetween such that the bridge is permitted to pivot vertically about a pivot axis toward and away from the windshield and wherein the side members of the yoke prevent the pivot support member from rotating in a horizontal orientation substantially parallel to the windshield. The bridge includes a registration system engageable with the pivotally mounted base of the bridge for retaining the base member of the bridge in the original position and for selectively permitting rotation of the base member of the bridge from the original position to a rotated position upon the manual retraction of the registration system by the user to release the base member from connection with the pivot support member. The registration system includes a locking pin disposed within a base member of the bridge and biased for engagement with a corresponding locking cavity formed in the pivot support member.

15 Claims, 4 Drawing Sheets

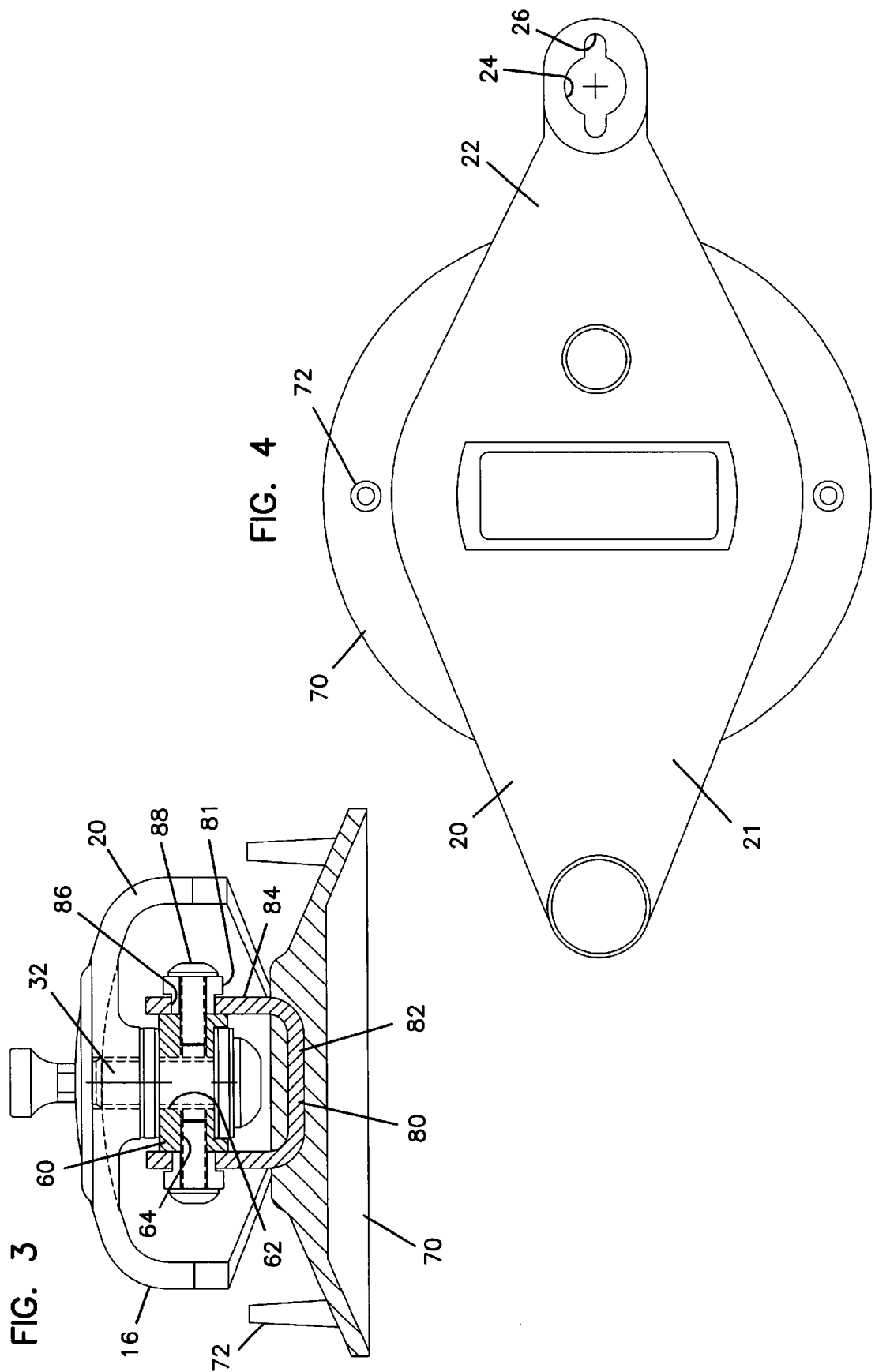

WINDSHIELD REPAIR APPARATUS

BACKGROUND OF THE INVENTION

1. Field of the Invention

This invention relates to an apparatus for repairing breaks in windshields.

2. Brief Description of the Art

From time to time, a vehicle windshield will break, such as due to an object impacting against the windshield. A bulls-eye break may occur where the outer layer of safety glass incurs a break in the shape of an inverted cone. Other break shapes and cracks may be incurred in addition to or instead of the bulls-eye break. The inside layer of safety glass is typically unbroken. U.S. Pat. No. 5,565,217, issued Oct. 15, 1996, the disclosure of which is incorporated by reference, illustrates an apparatus usable to repair a break in a vehicle windshield. The apparatus disclosed in the '217 reference includes a support apparatus for supporting an injector held against the windshield so that repair material may be applied to the break site. A repaired windshield is desirable over replacement of the windshield which can be quite costly, and time consuming.

There are concerns arising in connection with repaired windshields. One area of concern relates to the ease of use of the windshield repair apparatus. In particular, the ease in which the site is prepared, and the ease of application of the repair material are concerns. Accessibility to the site for the application of the repair material, and removal of the impurities (e.g., air, moisture, dirt) from the break site and from the repair material are concerns. Additionally, the stability of the support apparatus which supports the injector is also a concern. Ease of handling of the windshield repair apparatus is a further concern. Providing a simplified structure for ease of use and reducing manufacturing costs is also a concern. A goal of the repair process is to leave an optically invisible or virtually invisible repair site. Minimizing material waste is also a concern.

There is a need in the prior art for an apparatus which addresses the above concerns and other concerns.

SUMMARY OF THE INVENTION

The present invention relates to a windshield repair apparatus including a support apparatus or bridge for holding an injector adjacent to a break area of a windshield. The windshield repair apparatus includes a suction cup for mounting the bridge to the windshield.

A preferred bridge includes a base member pivotally connected to a pivot support member with the suction cup including a connection member comprising a yoke extending upward from the suction cup to pivotally connect the suction cup to the pivot support member of the bridge. Preferably, the yoke includes at least two side members which are adapted to receive the pivot support member of the bridge therebetween such that the bridge is permitted to pivot vertically about a pivot axis towards and away from the windshield and wherein the side members of the yoke prevent the pivot support member from rotating in a horizontal orientation substantially parallel to the windshield.

Preferably, the base member of the bridge is pivotally connected to the pivot support member such that the base including the injection holder is rotatable in a horizontal orientation substantially parallel to the windshield which allows for movement of the injector away from the break area while the pivot support member maintains its stationary horizontal position in connection with the connection member of the suction cup.

Alternatively, a preferred bridge includes a registration system which allows for accurate replacement of the injector over the break area following rotation of the base member from a rotated position back to its original position. Preferably, the registration system is engageable with the pivotally mounted base member of the bridge for retaining the base member of a bridge in the original position and selectively permitting rotation of the base member of the bridge from the original position to a rotated position upon the manual retraction of the registration system by the user to release the base from connection with the pivot support member. Preferably, the registration system includes a locking pin disposed within the base member of the bridge which is biased for engagement with a corresponding locking cavity formed in the pivot support member such that the locking pin is securely disposed within the locking cavity of the pivot support member when the base is in the original position. The locking pin is manually retractable by a user out of connection with the locking cavity such that the base member of the bridge is pivotable to the rotated position. A preferred locking pin includes a top handle portion to facilitate gripping of the locking pin by a user to permit retraction of the locking pin out of the locking cavity within the pivot support member. Preferably, the pivot support member includes a ramp section adjacent to the locking cavity wherein upon rotation of the base member of the bridge from the rotated position to the original position, the locking pin engages the ramp which serves to force the locking pin upward against the biasing force such that when the base member of the bridge reaches the original position, the locking pin is forced downward to extend into the locking cavity to secure the base member of the bridge in the original position.

BRIEF DESCRIPTION OF THE DRAWINGS

FIG. 3 is a left side sectional view of the bridge of FIG. 1;

FIG. 4 is a top plan view of the bridge of FIG. 1;

DETAILED DESCRIPTION OF THE PREFERRED EMBODIMENTS

Figure 1:
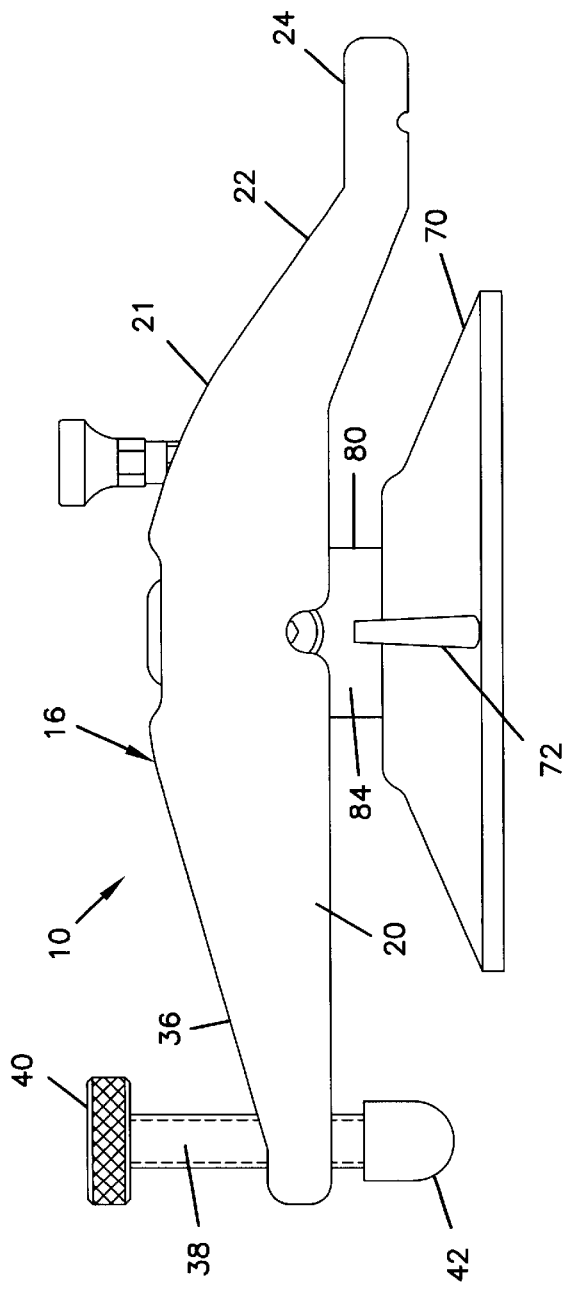
FIG. 1 is a side view of a first embodiment of a windshield repair apparatus in accordance with the principles of the present invention.

Referring now to FIGS. 1–6, a first embodiment of a windshield repair apparatus 10 is shown. Apparatus 10 includes a support apparatus or bridge 16 which has a portion defining an injection holder 24 for receiving a injector 12. The injector 12 is used to apply a repair material, such as an ultra-violet light curable plastic resin, to a break area on the windshield. Further details regarding the injector 12 are disclosed in the '217 patent referenced above. The apparatus 10 includes a support apparatus or bridge 16 which includes a base member 20 and a pivot support member 60 connected thereto. A suction cup 70 is connected to the bottom of the bridge 16 to secure the bridge to the windshield so that the bridge is able to position the injector 12 adjacent a break area in the windshield.

In a preferred embodiment, the base member 20 of the support member or bridge 16 includes a front portion 22 which defines an injection holder 24 for receiving the injector 12. (See FIG. 5). Preferably, the upper surface 21 of base member 20 comprises a substantially continuous surface and is tapered inward from the center of the base member toward the injector holder 24 (See FIG. 4). Preferably, the upper surface 21 of the base member 20 is angled downward toward the injection holder 24 so that this facilitates easy gripping and maneuvering of the support member or bridge 16 by the user during use of the apparatus to repair a windshield. The injection holder 24 is designed to receive the injector 12 to secure the injector 12 in position adjacent the break in the windshield.

Figure 6:
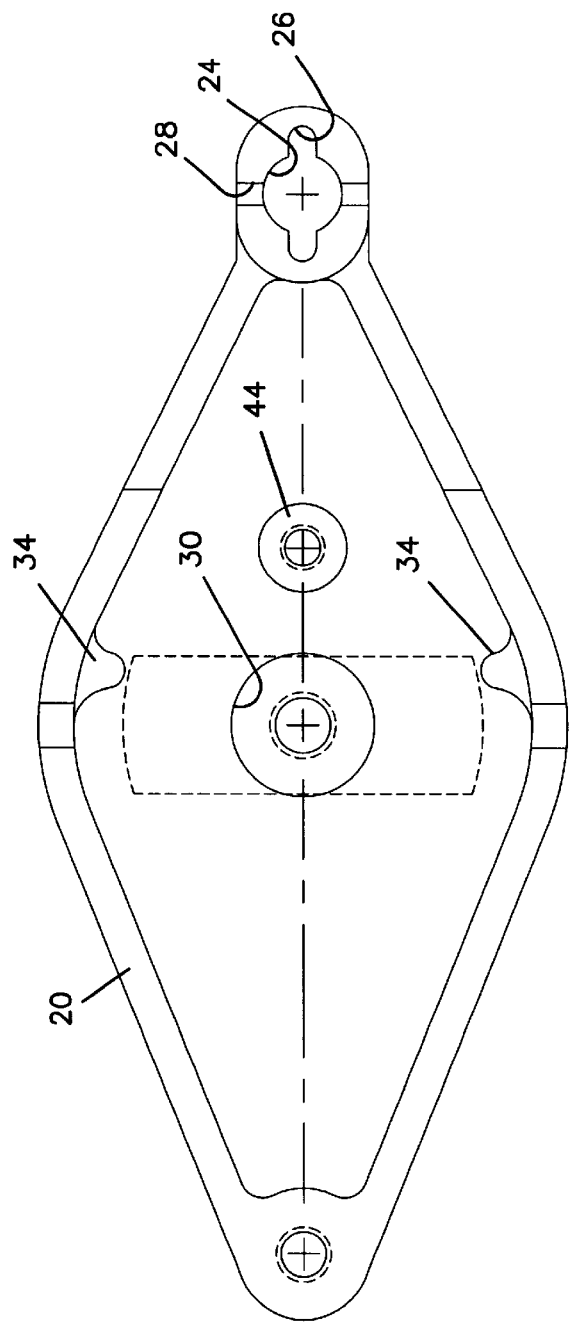
FIG. 6 is a bottom view of the base member of the bridge of FIG. 1.
Figure 7:
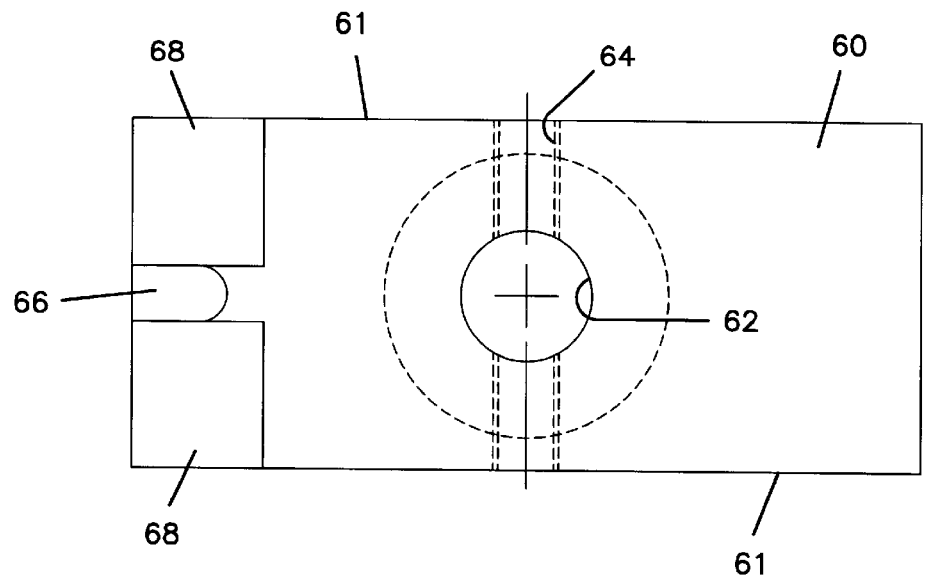
FIG. 7 is a top view of the pivot support member of the apparatus of FIG. 1.
Figure 8:
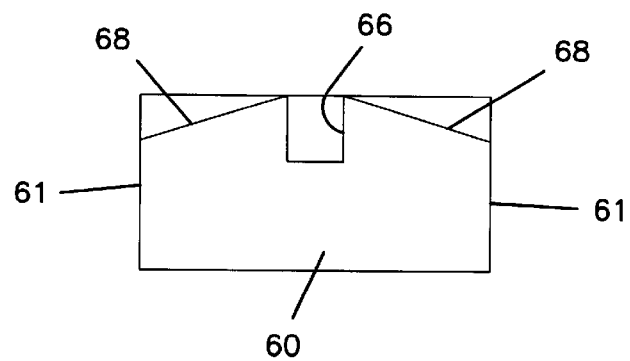
FIG. 8 is a left side view of the pivot support member of FIG. 7.
Figure 9:
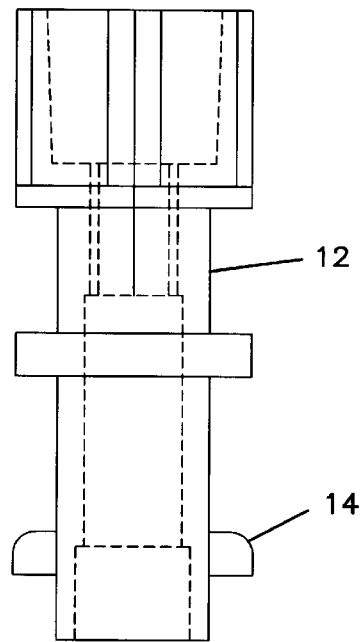
FIG. 9 is a front view of the injector shown in FIG. 5.

In one embodiment, the injector holder 24 includes slots 26 for receiving tabs 14 which extend radially outward from the injector 12 (See FIGS. 6, 9). In one embodiment, the injector 12 is spring loaded, such as by foam, rubber, spring washer (represented by spring 25) such that once the tabs 14 of the injector 12 are inserted through the corresponding slots 26 in the injector holder 24, the injector is further inserted downward against the biasing force of the spring and then turned 90° so that the tabs 14 engage notches 28 on the bottom of the injector holder 24 (See FIG. 6). In this way, the injector 12 is then securely retained within the injector holder 24 under the biasing force of the spring 25. It is appreciated that other methods may be used for securing the injector 12 to the support member or bridge 16, such as threads.

The base member 20 further includes a center shaft 30 which is adapted for alignment adjacent the center shaft 62 of the pivot support member 60. The pivot support member 60 is disposed beneath the center portion of the base member 20. A bolt or pin 32 preferably extends up the center shaft 62 of the pivot support member 60 and is received in corresponding threads within the center shaft 30 of the base member 20. Bearings 33 are provided adjacent the pivot support member 60 so that the base member 20 is rotatable about a rotation axis perpendicular to the windshield defined by the center shaft 30 and bolt 32 combination. In this way, the base member 20 is able to rotate in a horizontal orientation substantially parallel to the windshield to which the bridge 16 is secured.

The apparatus 10 further includes a suction cup 70 which is secured to the pivot support member 60 of the bridge 16. In one embodiment, the suction cup 70 includes a connection member or yoke 80 for connecting the suction cup to the pivot support member 60 of the bridge 16. Referring to FIG. 3, the yoke includes a base portion 82 with side members 84 extending upward from the suction cup 70 to receive the pivot support member 60 therebetween. In one embodiment, the pivot support member 60 constitutes a rectangular block wherein the side walls 61 of the pivot support member 60 are dimensioned to fit closely between the side members 84 of the yoke 80. Each of the side members 84 of the yoke 80 includes a shaft or aperture 86 which is in alignment with a corresponding pivot shaft 64 that runs through the pivot support member 60 perpendicular to the center shaft 62. Referring to FIG. 3, a bolt or pin 88 is inserted in each of the side members 84 to extend into the pivot shaft 64 of the pivot support member 60 so that the pivot support member 60 is rotatable about its pivot shaft 64 in a vertical orientation towards and away from the windshield. In one embodiment, the bolt or pin 88 is threaded into connection with the pivot shaft 64 and bearings 89 provided to permit rotation of the bolt or pin 88. In this way, the pivot support member 60 is able to pivot the entire support member or bridge 16 toward and away from the windshield through this pivot connection of the yoke 80 of the suction cup 70.

A pivot actuator is provided for causing pivoting movement of injector 12 toward and away from the windshield. In the preferred embodiment, the base member 20 includes a rear portion 36 which terminates in an end containing a threaded shaft 38 which is used to adjust the vertical orientation of the bridge 16. This threaded shaft 38 includes a knob 40 and plastic tip 42. The plastic tip 42 engages the windshield and by rotation of the knob 40, the entire bridge 16 including the base member 20 and pivot support member 60 is able to pivot vertically toward and away from the windshield. In this way, the injector 12 positioned opposite the threaded shaft 38 may be vertically adjusted in its position adjacent the break area of a windshield. It is appreciated that by disposing the pivot support member 60 securely between the side members 84 of the yoke 80, the pivot support member is able to pivot vertically but is prevented from rotating horizontally in an orientation substantially parallel to the windshield. It is appreciated that this yoke 80-pivot support member 60 connection provides for enhanced stability of the bridge 16 during use on a windshield to repair a break on a windshield.

Figure 2:
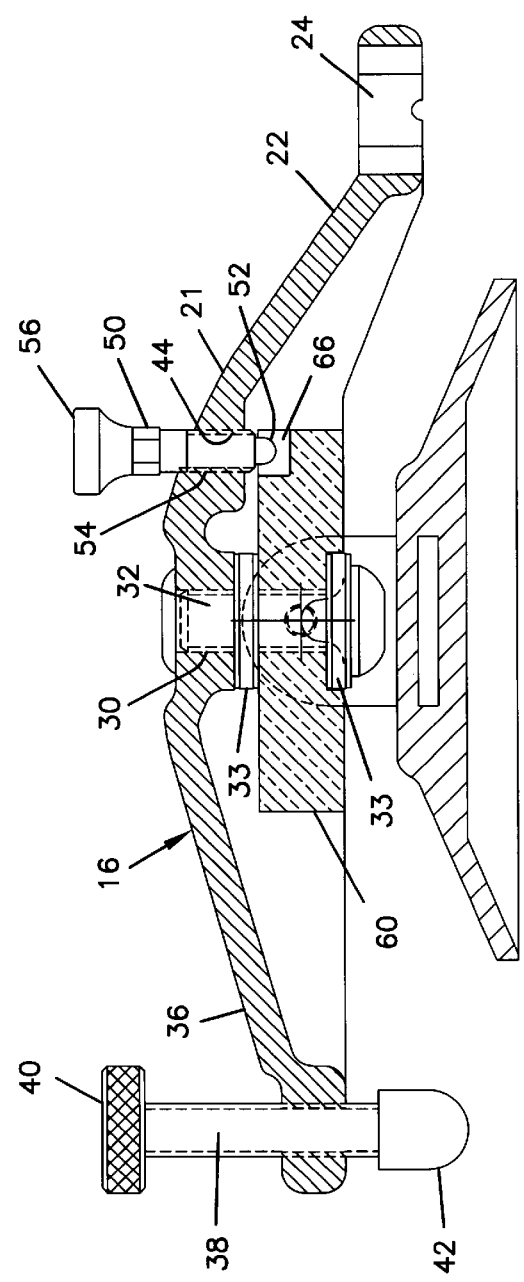
FIG. 2 is a side sectional view of the bridge of FIG. 1.
Figure 5:
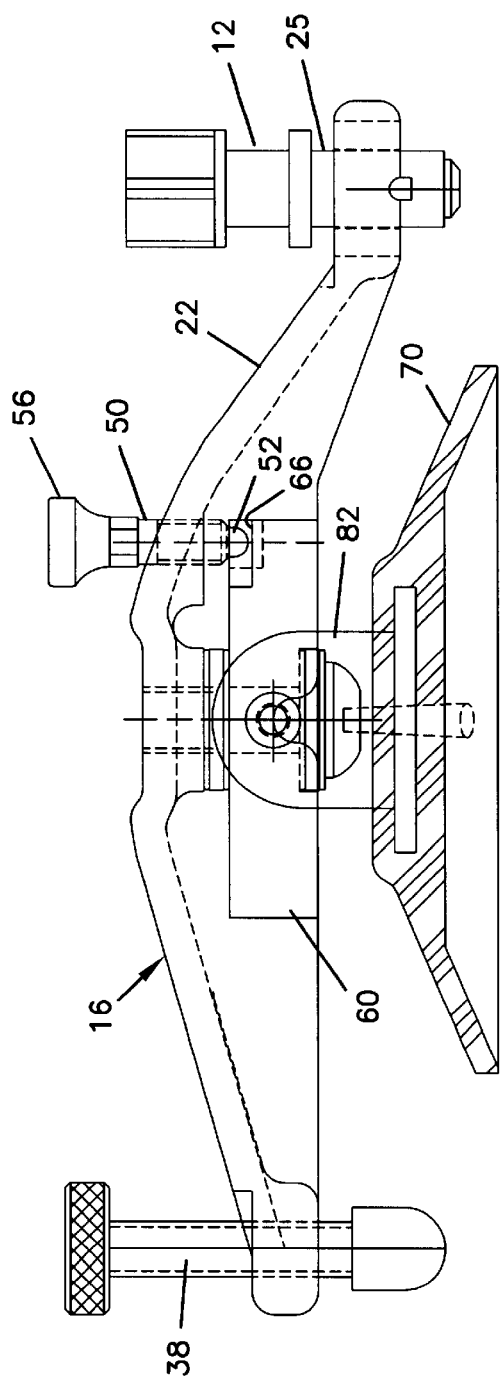
FIG. 5 is a side sectional view of the bridge of FIG. 1 further including an injector secured to the bridge of the apparatus.

Referring to FIG. 2, the base member 20 is preferably rotatable about its center shaft 30 in a horizontal orientation substantially parallel to the windshield. As described above, pivot support member 60 is secured between the side members 84 of the yoke 80 and is thus prevented from rotating in a horizontal orientation. In a preferred embodiment, the support member or bridge 16 preferably includes a registration system for permitting a user to rotate the base member 20 including the injector radially away from the break area and then subsequently allowing rotation of the base member 20 and injector 12 back to its original location adjacent the break in the windshield.

In one embodiment, the base member 20 includes a locking pin shaft 44 for receiving a locking pin 50 therein. The locking pin 50 extends downward through the base member 20 so that a bottom tip 52 of the locking pin engages a corresponding locking cavity 66 in the pivot support member 60. The locking pin 50 preferably is biased through a spring 54 to normally force the tip 52 of the locking pin 50 securely into the locking cavity 66 of the pivot support member 60 to thus securely connect the base member 20 to the pivot support member 60. For example, Vlier®, Barry Controls of Brighton, Mass., manufactures a hand retractable plunger. In this way, in this first original position, the base member 20 is secured to the pivot support member 60 and thus is not permitted to rotate horizontally substantially parallel to the windshield. Thus, when a user first positions the bridge on the windshield adjacent the break area, the base member 20 positions the injector 12 in a secure position for use adjacent to the break area.

In order to rotate the base member 20 and the injector 12 away from a break area, the locking pin 50 is retractable upward so that the tip 52 of the locking pin 50 is able to retract out of the locking cavity 66 to thus permit rotation of the base member 20 about the pivot support member 60. In use, the locking pin 50 is manually retracted upward by a user through gripping the handle 56 on the top of a locking pin 50. In use, a person simply pulls the handle 56 of the locking pin 50 upward to remove the tip 52 from the locking cavity 66 of the pivot support member 60 and the user can then rotate the base member 20 horizontally to remove the injector 12 from the area adjacent the break. This way, the user can then inspect the break area to determine if additional material from the injector is required. To rotate the base member and the injector back to its original location, the user simply rotates the base member 20 back towards its original position wherein the locking pin engages a corresponding ramp 68 on the pivot support member 60 which serves to force the tip of a locking pin upward against the biasing force of the spring. In this way, the ramp positions the tip 52 of the locking pin so that when the base member 20 returns to the original position, the locking pin then extends downward under the force of the biasing spring into the locking cavity 66 of the pivot support member 60 to thus secure the base member and the injector back to its original position.

It is appreciated that by requiring the manual retraction of the locking pin 50 from the locking cavity 66, the user may only rotate the base member away from its original position upon the maneuvering of the locking pin 50. In this way, the base member and injector may not be accidentally removed from its original position in place adjacent the break area. It is further appreciated that the ramps 68 on the pivot support member 60 facilitate the easy positioning of the locking pin before insertion back within the locking cavity 66 of the pivot support member 60.

In a preferred embodiment, the base member 20 includes limit stops 34 positioned on the bottom side of the base member 20 for limiting rotation of the base member about the pivot support member 60. Referring to FIG. 6, the limit stops 34 are positioned to engage a portion of the pivot support member 60 after the base member 20 has been rotated from its original position in alignment with the pivot support member 60 to a rotated position wherein the injector 12 is rotated away from the break area of the windshield. The limit stops prevent further rotation of the base member 20 to provide for the efficient rotation of the base member back to its original position when desired.

In one embodiment, the suction cup 70 preferably includes removal tabs 72 to assist in relocating the position of the apparatus 10 on the windshield (See FIG. 3). A user simply pulls upward on the removal tabs 72 to break the seal of the suction cup so that the apparatus can then be moved to another location.

It is to be understood that even through numerous characteristics and advantages of various embodiments of the present invention have been set forth in the foregoing description, together with the details of the structure and function of various embodiments of the invention, this disclosure is illustrative only in changes may be made in the details, especially in matters of shape, size, and arrangements of the parts within the principles of the present invention to the full extent indicated by the broad general meaning of the terms in which the appending claims are expressed. All alternative modifications and variations of the present invention which fall within a spirited and broad scope of the appended claims are covered.

What is claimed is:

1. A windshield repair apparatus for use on a windshield comprising:
   a bridge having a base member including a front portion defining an injection holder, and a pivot support member disposed below the base member and pivotally connected to the base member; and
   a suction cup disposed for connection with the pivot support member of the bridge for mounting the bridge to the windshield, the suction cup including a connection member including a yoke which extends upward from the suction cup to pivotally connect the suction cup to the pivot support member of the bridge, wherein the yoke includes at least two side members which are adapted to receive the pivot support member of the bridge therebetween, such that the bridge is permitted to pivot vertically about a pivot axis toward and away from the windshield and wherein the side members of the yoke prevent the pivot support member from rotating in a horizontal orientation substantially parallel to the windshield.

2. The apparatus of claim 1 wherein the base member of the bridge is pivotally connected to the pivot support member such that the base member including the injection holder is rotatable in a horizontal orientation substantially parallel to the windshield while the pivot support member maintains its stationary horizontal position in connection with the suction cup.

3. The apparatus of claim 2 wherein the base member includes at least one limit stop disposed at or near the bottom of the base member such that after a predetermined amount of rotation of the base member in a horizontal orientation substantially parallel to the windshield, the limit stop engages the pivot support member to prevent further rotation of the base member.

4. The apparatus of claim 2 further comprising a registration system between the base member and the pivot support member for retaining the base member of the bridge in an original position and for selectively permitting rotation of the base member from the original position to the rotated position upon release of the registration system.

5. The apparatus of claim 1 further comprising a pivot actuator connected to the bridge for causing pivoting movement of the bridge and injector toward and away from the windshield.

6. The apparatus of claim 2 wherein the pivot support member comprises a rectangular block positioned within the yoke such that two opposing sidewalls of the block are disposed adjacent the side members of the yoke.

7. A windshield repair apparatus for use on a windshield comprising:
   a bridge having a base member including a front potion defining an injection holder, and a pivot support member which is pivotally connected to the base member of the bridge such that the base member of the bridge is rotatable about a rotation axis perpendicular to the windshield between an original position and a rotated position; and
   a suction cup connected to the bridge for mounting the bridge to the windshield;
   wherein the bridge includes a registration system, engageable with the base member and pivot support member of the bridge for retaining the base member of the bridge in the original position and for selectively permitting rotation of the base member of the bridge from the original position to the rotated position Upon the manual activation of the registration system by the user to release the base member from connection with the pivot support member to allow rotation of the base member to the rotated position;
   wherein the registration system includes a locking pin disposed within the base member of the bridge and biased for engagement with a corresponding locking cavity formed in the pivot support member wherein the locking pin is securely disposed within the locking cavity of the pivot support member when the base member is in the original position and wherein the locking pin is manually retractable out of connection with the locking cavity such that the base member of the bridge is pivotable to the rotated position, wherein the locking pin of the registration system includes a top handle portion to facilitate gripping of the locking pin by a user to permit retraction of the locking pin out of engagement with the locking cavity of the pivot support member.

8. The apparatus of claim 7 wherein the pivot support member includes a ramp section adjacent to the locking cavity wherein upon rotation of the base member of the bridge from the rotated position to the original position, the locking pin engages the ramp which serves to force the locking pin upward against the biasing force such that when the base member of the bridge reaches the original position, the locking pin is biased downward to extend into the locking cavity to secure the base member of the bridge in the original position.

9. A windshield repair apparatus for use on a windshield comprising:

a bridge having a base member including a front portion defining an injection holder, and a pivot support member disposed below the base member and pivotally connected to the base member such that the base member of the bridge is rotatable about a rotation axis perpendicular to the windshield between an original position and a rotated position; and a suction cup disposed for connection with the pivot support member of the bridge for mounting the bridge to the windshield, the suction cup including a connection member comprising a yoke which extends upward from the suction cup to pivotally connect the suction cup to the pivot support member of the bridge, wherein the yoke includes at least two side members which are adapted to receive the pivot support member of the bridge therebetween, such that the bridge is permitted to pivot vertically about a pivot axis toward and away from the windshield and wherein the side members of the yoke prevent the pivot support member from rotating in a horizontal orientation substantially parallel to the windshield;

wherein the bridge includes a pivot actuator connected to the bridge for causing pivoting movement of the bridge and injector toward and away from the windshield; and wherein the bridge includes a registration system, engageable with the base member of the bridge for retaining the base member of the bridge in the original position and for selectively permitting rotation of the base member from the original position to the rotated position upon the manual reaction of the registration system by the user to release the base member from connection with the pivot support member to allow rotation of the base member to the rotated position.

10. The apparatus of claim 9 wherein the registration system includes a locking pin disposed within the base member of the bridge and biased for engagement with a corresponding locking cavity formed in the pivot support member wherein the locking pin is securely disposed within the locking cavity of the pivot support member when the base member is in the original position and wherein the locking pin is manually retractable out of connection with the locking cavity such that the base member of the bridge is pivotable to the rotated position.

11. The apparatus of claim 10 wherein the locking pin of the registration system includes a top handle portion to facilitate gripping of the locking pin by a user to permit retraction of the locking pin out of engagement with the locking cavity of the pivot support member.

12. The apparatus of claim 10 wherein the pivot support member includes a ramp section adjacent to the locking cavity wherein upon rotation of the base member of the bridge from the rotated position to the original position, the locking pin engages the ramp which serves to force the locking pin upward against the biasing force such that when the base member of the bridge reaches the original position, the locking pin is biased downward to extend into the locking cavity to secure the base member of the bridge in the original position.

13. The apparatus of claim 12 wherein the locking pin of the registration system includes a top handle portion to facilitate gripping of the locking pin by a user to permit retraction of the locking pin out of engagement with the locking cavity of the pivot support member.

14. The apparatus of claim 9 wherein the base member includes at least one limit stop disposed at or near the bottom of the base member such that after a predetermined amount of rotation of the base member in a horizontal orientation substantially parallel to the windshield, the limit stop engages the pivot support member to prevent further rotation of the base member.

15. The apparatus of claim 10 wherein the pivot support member comprises a rectangular block positioned within the yoke such that two opposing sidewalls of the block are disposed adjacent the side members of the yoke.

\* \* \* \* \*

UNITED STATES PATENT AND TRADEMARK OFFICE
CERTIFICATE OF CORRECTION

PATENT NO.   : 6,302,670 B1  
DATED        : October 16, 2001  
INVENTOR(S)  : Thomas et al.

It is certified that error appears in the above-identified patent and that said Letters Patent is hereby corrected as shown below:

Column 6,  
Line 43, "front potion" should read -- front portion --  
Line 57, "Upon" should read -- upon --

Column 7,  
Line 8, "engagenment" should read -- engagement --

Column 8,  
Line 3, "reaction" should read -- retraction --

Signed and Sealed this

Fourth Day of March, 2003

JAMES E. ROGAN  
*Director of the United States Patent and Trademark Office*